United States Patent Office 2,955,673
Patented Oct. 11, 1960

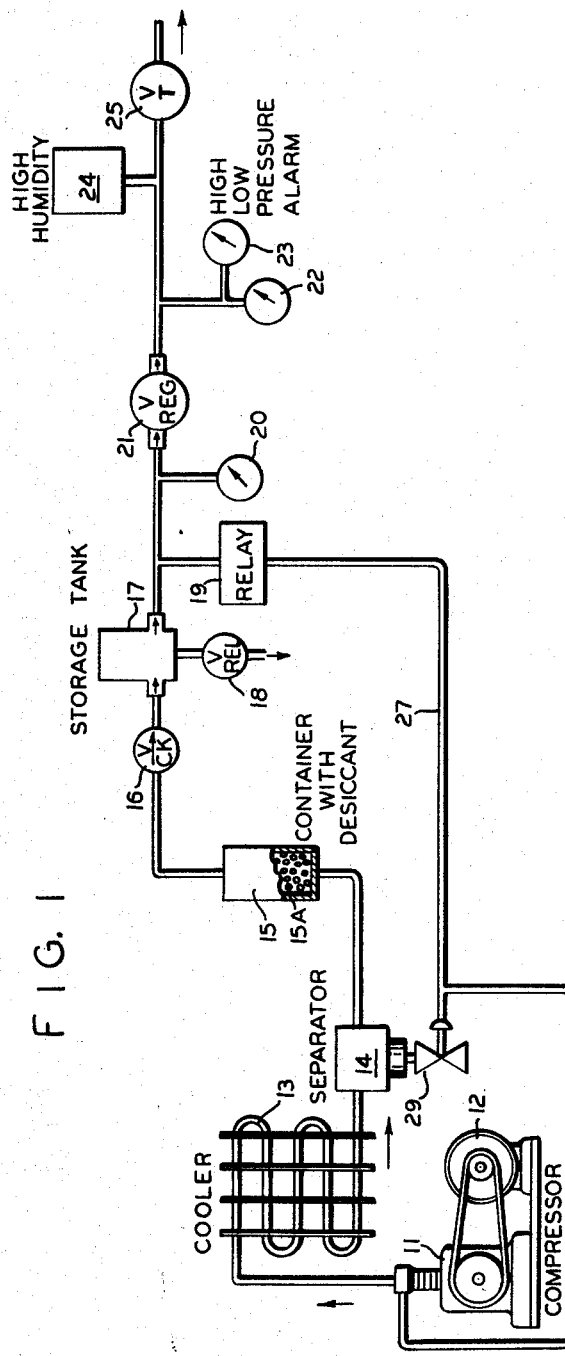

2,955,673
PROCESS AND APPARATUS FOR DEHYDRATING GAS

Starrett C. Kennedy, Glastonbury, and Robert S. Sheldon, West Hartford, Conn., assignors to Kahn and Company, Incorporated, Hartford, Conn., a corporation of Connecticut Filed Aug. 18, 1958, Ser. No. 755,714
9 Claims. (Cl. 183—4.1)

This invention is related to a process and apparatus for producing dehydrated gas and more specifically refers to a new and novel process and apparatus for producing dehydrated air whereby the apparatus is maintained in proper operating condition without cyclic application of heat.

In most process industries a continuous supply of dehydrated gas is required for control and measuring purposes. The majority of prior art devices for producing dehydrated gas make use of the principle of first compressing wet gas thereby condensing water vapor, then passing the partially dehydrated gas through one of a pair of so-called "towers" which are containers in which there is disposed a chemical desiccant. The desiccant absorbs the remaining moisture contained in the gas. Subsequently, the dried gas is accumulated in a storage tank for use in the utilization circuit. The desiccant in each tower, by virtue of its absorbing moisture becomes increasingly "wet" and therefore rendered ineffective, the period of time dependent upon the quantity of chemical desiccant used and upon the quantity and moisture content of the gas processed. When the desiccant finally has become ineffective or saturated with moisture, it must be regenerated which usually is accomplished by the application of heat. By means of arranging two towers in parallel, the desiccant in one tower may be regenerated while the desiccant in the other tower is used for drying gas. In this manner, alternately one tower is connected in the gas flow while the other tower is being reconditioned for subsequent use. Switching of the towers is accomplished in general on a fixed time schedule, that is maintaining one tower active for a certain number of operating hours and using an equal number of hours for regenerating the desiccant. Similarly, the towers may be switched in and out of the cycle whenever a predetermined moisture level of the desiccant has been reached.

It will be apparent that the above system is burdened with three major disadvantages namely, the requirement for a dual tower system, the necessity of suitable controls for effecting cycling between two towers, and the provision of heating means around each tower together with associated control means.

It will be apparent that the use of two towers not only multiplies the number of elements used in a system, but requires also a larger and more space-consuming dehydration unit. Aside from the duplication of components, additional flow control elements are required together with extra pipe connections, tight joints, and so forth. The regeneration of the desiccant by means of heat involves heating elements, the availability of electrical power at elevated voltage, an electrical sequence timer, and a contactor for transferring heating power from one tower to the other.

The instant invention describes a dehydration unit which requires but a single "tower" and dispenses with the application of heat for regeneration of the desiccant. The design of the heatless dehydration unit is based on the following two considerations: First, a volume of gas saturated with moisture at a fixed temperature carries practically the same amount of water vapor irrespective of the gas pressure. Second, the desiccant absorbs or desorbs (release of water vapor previously adsorbed) water vapor depending upon the relative vapor pressure of the desiccant and the gas in contact with it. The moisture passes from the higher vapor pressure to the lower vapor pressure substance.

These considerations may be translated into practical use as follows: It can be shown for instance that if a desiccant absorbs water vapor from a certain quantity of gas pumped at a pressure of 100 pounds per square inch gauge, the same amount of moisture can be released from the desiccant using 15 percent of the pumped gas quantity provided that the 15 percent are permitted to flow through the desiccant at atmospheric pressure. At 200 pounds pumped pressure, only about 7.5 percent are required and at 300 pounds only about 5 percent of the pumped quantity are required for regenerating the desiccant at atmospheric pressure level. This effect, as explained above, is achieved primarily because under constant temperature conditions, the amount of moisture which can be maintained in a quantity of gas remains substantially constant irrespective of the pressure at which the gas is pumped. Since a quantity of gas pumped for instance at 100 p.s.i. contains so much more gas than an equal volume pumped at one p.s.i., it is obvious that reactivation or regeneration of the desiccant can be obtained with a fraction of the amount of the gas previously pumped at higher pressure over the same desiccant provided purging is accomplished at a considerably lower pressure level.

The instant invention employs this principle and uses a single tower through which gas is pumped for dehydration purposes. Periodically and in a cyclic manner, a portion of the dehydrated gas is used for regenerating the desiccant. This method results in a simplified design which obviously has many advantages over the prior art devices.

In its simplest embodiment the process for producing dehydrated gas according to the instant invention comprises the steps of compressing a quantity of wet gas, passing the compressed quantity through a container containing a desiccant which absorbs moisture remaining in the compressed quantity of gas, accumulating the compressed quantity of gas in a storage tank, and then cyclically releasing a portion of the compressed quantity of gas and sending it through the container to the desiccant while temporarily preventing flow of a newly compressed quantity of gas to the container.

One of the objects of this invention therefore is the provision of a process and apparatus for producing dehydrated gas which avoid one or more of the disadvantages and limitations of prior art devices.

Another object of this invention is the provision of a process and apparatus for producing dehydrated gas which employ a single container containing a desiccant, yet providing a continuous supply of dehydrated gas to a utilization circuit.

Another object of this invention is the provision of a process and apparatus which employ gas flow in one direction for producing dehydrated gas and use cyclically reversed gas flow for regenerating the desiccant.

Another object of this invention is the provision of an apparatus for producing dehydrated gas which regenerates the desiccant without the application of heat.

A further object of this invention is the provision of an apparatus for producing dehydrated gas which is characterized by a minimum number of essential components.

A still further object of this invention is the provision of an apparatus for producing dehydrated gas which is characterized by extreme reliability and ease of maintenance.

Another and further object of this invention is the provision of a process and apparatus in which gas is pumped for dehydration at a first gas pressure and wherein a portion of the dehydrated gas is utilized for regenerating the desiccant whereby the portion of gas used for regenerating purposes flows in contact with the desiccant at a lower pressure level than the previous pumping pressure.

A still further and other object of this invention is the provision of a process and apparatus for producing dehydrated gas in which the flow of dehydrated gas to a storage tank is cyclically interrupted while maintaining however, substantially constant flow of dehydrated gas to a utilization circuit connected to the storage tank.

Further and other objects of this invention will be apparent by reference to the following description taken in conjunction with the accompanying drawings in which:

Figure 1 is a schematic diagram of the apparatus according to the invention, and Figure 2 is an alternate design of a flow control means used in Figure 1.

Referring now to the figures, numeral 11 identifies an air compressor, driven by a motor 12, which takes air from the atmosphere (ambient), compresses the air and sends it to a cooler 13. The air flowing through the cooler becomes cooled, thereby condensing moisture and is passed on to a centrifugal type separator 14, which receives the air and moisture for further separation and which is usually mounted at a low point of the system so that moisture settled in the cooler flows into the separator by gravity. Separators of this type are well known in the art being commercially available, and need not be described further.

From the separator the air is passed on to a container 15 which contains an amount of desiccant 15A such as silica gel, activated alumina or similar chemical material well known in the art for absorbing gas. Container 15 frequently is referred to as a "tower," usually being a cylindrical enclosure, sometimes dome-shaped, and mounted vertically.

From the container and the desiccant, the gas is passed through a differential flow control means 16 to a storage tank 17 which accumulates the dehydrated gas used in a utilization circuit. The differential flow control means 16 are designed in such a manner that substantially unimpeded flow is achieved in the direction from the container 15 to tank 17 but only restricted flow is permitted in the reverse direction, that is, from the tank 17 to the container 15. There are several ways in which this differential flow control may be achieved as for instance by the use of a check valve and a small aperture drilled through the valve diaphragm so that when the valve is closed, gas flow in the reverse direction can occur only through the small aperture. An alternate solution is presented in Figure 2. In this figure, a standard check valve 31 is bypassed by an arrangement 32 which includes a housing and a closely fitted disk which either is equipped with an aperture or which permits restricted flow around its circumference. Still further, combination 32 might comprise a standard needle valve.

Attached to tank 17 there is a safety release valve 18 which opens upon excessive pressure. Moreover, a pressure relay 19 senses and monitors the pressure in the storage tank 17; the function of this relay will be set forth later. Other elements which may be included in the instant arrangement may comprise: a pressure gauge 20, a regulating valve 21, a pressure gauge 22 indicating regulated pressure, a high-low pressure alarm 23, a high humidity alarm 24, and a valve 25 which establishes flow connection to the utilization circuit. It will be obvious that several of these gauges and alarm features are optional and may be omitted without affecting the operation of the instant apparatus.

When the pressure in the storage tank 17 assumes a predetermined value, pneumatic relay 19 is activated and sends a small amount of gas or a pneumatic control signal via control pipe 27 to the inlet valve (not shown) of the compressor 11 to "unload" the compressor, that is, preventing the compressor from compressing gas by maintaining the inlet valve open. Simultaneously, the same control line is connected to a pneumatically operated valve 29 connected to the separator. This valve is normally closed but when receiving the signal via line 27, one end of the valve becomes open to atmosphere to vent the separator.

The operation of the entire apparatus may be visualized as follows:

Normally the compressor, driven by the motor, compresses gas, sends the gas through the cooler to the separator, thence through the container and over the desiccant, through the differential flow control means (substantially full flow) and to the storage tank. When the pressure in the storage tank attains a predetermined value, pneumatic relay 19 unloads the compressor by maintaining its inlet valve open and opens also valve 29 to atmosphere. During this portion of the cycle no wet air is compressed but dehydrated air flows out of the tank and in reverse direction through differential control means 16, through container 15, separator 14, and through valve 29 to atmosphere. Since the differential flow means 16, during the period of reverse flow, permit only restricted flow out of the tank, dehydrated gas flows through the container 15 at a greatly reduced pressure, regenerating the desiccant and when finally reaching the separator, pushes condensed moisture which has accumulated in the separator via opened valve 29 to atmosphere. When the pressure in tank 17 by virtue of this reverse flow has dropped to a predetermined lower level, pneumatic relay 19 is deactivated, causing closing of the compressor inlet valve and of the vent valve 29, thereby restoring the flow of compressed and dehydrated air to storage tank 17. Since only a portion of the amount of gas stored in storage tank 17 is used during the time of the reverse flow, that is during the time of regeneration of the desiccant and while expelling liquid from the separator, the flow of dehydrated gas from the tank 17 to the utilization circuit via valves 21 and 25 is maintained on a continuing basis.

The following data are representative of a typical embodiment of the instant invention and have been measured on a representative unit. It should be understood however, that these values in no way may be construed or interpreted as constituting limitations but are included herein merely for illustrative purposes. Air at the inlet valve of compressor 11 shows a temperature of 70° F. and has a water content of 12,000 parts per million by weight. The compressor compresses at a rate of 1.58 standard cubic feet per minute and raises the temperature of the air to 230° F. After passing through the cooler, the compressed and partially dehydrated air has dropped to a temperature of 100° F. and measures a water content of 6,200 parts per million by weight. The container 15 is fitted with 5.4 ounces of grade 03 silica gel. The storage tank having a volume of 0.5 cubic foot accumulates the dehydrated air and while being connected to a utilization circuit permits air flow at a continuous rate of 0.6 standard cubic foot per minute at 100° F. and with 7 parts per million of water by weight, available at pressures from 0 to 30 p.s.i.g. as measured at valve 25.

After 75 seconds of generating dehydrated air, the tank has obtained a pressure level of 66 p.s.i.g. At this pressure level, the pneumatic relay becomes activated and prevents further flow of compressed gas toward the tank while opening valve 29. Dehydrated gas now flows at 1.68 s.c.f.m. through the differential flow control means 16, through the container 15, separator 14 and valve 29, expelling to atmosphere moist air and condensed water from the separator as well as a small quantity of lubricating oil originating at the bearings of the compressor. This reverse flow occurs for 30 seconds after which time the pressure in tank 17 has decreased to 33 p.s.i.g. At this instant the cycle is reversed again. Operating this apparatus in a cyclic manner as described above for several thousand hours, no deterioration of the quality of the dehydrated gas as well as any of the components has occurred.

It will be apparent to those skilled in the art that several modifications may be made without deviating from the principle described hereinbefore. Instead of a pneumatic relay 19, timing means may be employed, e.g. a sequence timer, to effect the same result, that is, cyclically reversing the flow of gas in and out of the storage tank. Moreover, instead of opening the compressor inlet valve to prevent the flow of compressed air toward tank 17, a release valve may be employed which is disposed between the compressor 11 and separator 14. This valve may be opened to atmosphere so as to release compressed air directly to ambient rather than passing air through the combination of the separator, container and differential flow control means which offers a greater resistance. Alternately, the compressor motor 12 may be stopped periodically, or a drive connection between the motor and compressor may be disabled cyclically, for instance using a magnetic clutch. In still another embodiment, the flow from the compressor may be allowed to flow out of the separator to atmosphere together with the purge flow from storage tank 17.

It will be apparent to those skilled in the art, that instead of pressure relay 19 or a sequence timer mentioned heretofore, pneumatic relay 19 could comprise a pressure relay with electrical contacts for transmitting an electrical signal (instead of pneumatic signal) to valve 29 and compressor 11. In this event, valve 29 would have to be solenoid operated and similarly the inlet valve of compressor 11 would be equipped with a solenoid valve. As a further alternate, relay 19 could be replaced by the combination of a pressure switch and a three-way solenoid valve.

The advantage of the arrangement described in connection with Figure 1 resides however in the fact that aside from electrical power used for energizing the drive motor, all electrical means and wiring are eliminated and that the entire arrangement operates on pneumatic pressure, the very medium which is being produced by the instant apparatus.

While there have been described and illustrated certain embodiments of the present invention, it will be obvious to those skilled in the art that various changes and modifications may be made therein without deviating from the principle and intent of the invention which shall be limited only by the scope of the appended claims.

What is claimed is:

1. An apparatus for producing dehydrated gas comprising: means for compressing a body of gas; a container containing a desiccant connected to receive said body of gas; a storage tank connected for receiving said body of gas after the gas has passed through said container; differential flow control means disposed between said container and said storage tank and said control means permitting greater gas flow from said container to said tank than from said tank to said container; means for cyclically preventing gas flow from said container to said tank whereby a portion of the body of gas stored in the tank is permitted to flow via said differential flow control means to said container to regenerate the desiccant disposed therein, and means for expelling said portion of gas after it has passed through said container from flow between said container and said tank.

2. An apparatus for producing dehydrated gas comprising: means for compressing a body of gas; a container containing a desiccant connected to receive said body of gas; a storage tank connected for receiving said body of gas after the gas has passed through said container; differential flow control means disposed between said container and said storage tank and said control means permitting greater gas flow from said container to said tank than from said tank to said container; means operative when the gas in the tank reaches a first pressure level for preventing gas flow from said container to said tank whereby a portion of the body of gas stored in the tank is permitted to flow via said differential flow control means to said container to regenerate the desiccant disposed therein; means for expelling said portion of gas after it has passed through said container from flow between said container and said tank, and means restoring the flow of compressed gas to said storage tank when the pressure in the tank reaches a second pressure level.

3. An apparatus for producing dehydrated gas comprising: means for compressing a wet body of gas; means for receiving said compressed body of gas and cooling it thereby condensing moisture; separating means connected to separate the condensed moisture from said gas; a container containing a desiccant connected to receive said gas from the separator whereby the desiccant absorbs vaporized moisture within said gas; a storage tank accumulating gas after it has passed through said container; means cyclically reversing the flow from said separating means to said tank to cause flow from said tank through said container and through the separating means to remove moisture from said desiccant and to remove also condensed moisture previously separated within said separating means, and means for expelling said moisture collected during the reverse flow.

4. An apparatus as set forth in claim 3 wherein differential flow control means are disposed in the gas flow between said container and said tank which means permit substantially free flow of gas in the direction from said container to said storage tank but restricted flow in the direction from said tank to said container to cause flow of gas in the latter direction to take place at a lower pressure level than in the former direction.

5. An apparatus as set forth in claim 3 wherein the means for cyclically reversing the flow of gas are actuated when the pressure in the storage tank reaches a first level and are deactivated when the pressure in the storage tank reaches a second level which is lower than the first one.

6. An apparatus for producing dehydrated air comprising: means for compressing wet air; a cooler connected to receive the wet air and cool it thereby condensing moisture from said air; a separator connected to receive said cooled air and separate the condensed moisture from said air; a container which includes a desiccant connected to receive the air from the separator whereby the desiccant absorbs moisture still vaporized in the air to cause dehydrated air; a storage tank accumulating the dehydrated air; flow control means disposed between said container and said tank permitting substantially full flow of air from said container to the storage tank but restricted flow from said tank to said container; means cyclically interrupting the flow of wet air from said separator to said tank while permitting flow of dehydrated air from said tank through said container containing desiccant to said separator to cause said air to regenerate the desiccant, and means for expelling the air used for regenerating the desiccant through said separator from said apparatus thereby expelling condensed moisture also from the separator.

7. An apparatus for producing dehydrated air as set forth in claim 6 wherein the means for compressing wet air is connected to the atmosphere and the air used for regenerating the desiccant and expelling condensed moisture from the separator is expelled to atmosphere.

8. An apparatus for producing dehydrated air as set forth in claim 6 wherein said means cyclically interrupting the flow of wet air temporarily deactivate the means for compressing air and vent the separator to ambient.

9. In an apparatus for producing dehydrated gas of the type described, the combination of: a container adapted to receive a quantity of gas under pressure and a desiccant for drying said quantity of gas when the gas is in said container; differential flow control means, including a leak passage, connected to said container and adapted to pass said gas therethrough to a storage tank after having been dried by said desiccant, and said differential flow means constructed to permit greater gas flow from the container to the tank than from the tank to said container to enable regeneration of said desiccant with gas from said tank.

References Cited in the file of this patent

UNITED STATES PATENTS

| | | |
|---|---|---|
| 1,798,733 | Hasche | Mar. 31, 1931 |
| 2,316,251 | Kahle et al. | Apr. 13, 1943 |
| 2,322,603 | Thumim et al. | June 22, 1943 |
| 2,440,326 | Cadman | Apr. 27, 1948 |
| 2,765,868 | Parks | Oct. 9, 1956 |

FOREIGN PATENTS

| | | |
|---|---|---|
| 795,497 | France | Nov. 12, 1940 |
| | (1st Addition No. 50,651) | |